(12) United States Patent
Reed

(10) Patent No.: US 7,765,746 B2
(45) Date of Patent: Aug. 3, 2010

(54) TORNADO RESISTANT DOME HOUSE

(76) Inventor: Robert S. Reed, 1204 Sunland Rd., Daytona Beach, FL (US) 32114

( * ) Notice: Subject to any disclaimer, the term of this patent is extended or adjusted under 35 U.S.C. 154(b) by 216 days.

(21) Appl. No.: 11/880,642

(22) Filed: Jul. 24, 2007

(65) Prior Publication Data
US 2009/0025306 A1    Jan. 29, 2009

(51) Int. Cl.
E04B 1/32 (2006.01)
E04B 7/08 (2006.01)
E04B 2/00 (2006.01)
E04H 9/02 (2006.01)

(52) U.S. Cl. .................... 52/80.1; 52/81.4; 52/167.4; 52/583.1

(58) Field of Classification Search ............. 52/80.1, 52/80.2, 81.1, 82, 167.1, 169.6, 292
See application file for complete search history.

(56) References Cited

U.S. PATENT DOCUMENTS

| | | | |
|---|---|---|---|
| 555,693 A | 3/1896 | Geraerdts | |
| 876,985 A | 1/1908 | Malancon | |
| 1,101,372 A | 6/1914 | Wisniewski | |
| 1,402,077 A | 1/1922 | Lanchester | |
| 2,200,636 A | 5/1940 | Palmer | |
| 2,629,139 A | 2/1953 | Thelander | |
| 2,879,557 A | 3/1959 | Wiegand | |
| 3,036,407 A | 5/1962 | Dixon | |
| 3,070,195 A | 12/1962 | Wilson | |
| 3,284,969 A | 11/1966 | Walters et al. | |
| 3,365,855 A | 1/1968 | Vermette | |
| 3,760,548 A | 9/1973 | Sauer et al. | |
| 4,425,745 A * | 1/1984 | Gratz et al. | 52/235 |
| 5,094,044 A * | 3/1992 | Dykmans | 52/80.1 |
| 5,097,640 A * | 3/1992 | Skolnick et al. | 52/81.3 |
| 5,471,804 A * | 12/1995 | Winter, IV | 52/220.1 |
| 5,555,681 A * | 9/1996 | Cawthon | 52/63 |
| 5,570,549 A * | 11/1996 | Lung et al. | 52/295 |
| 5,671,568 A | 9/1997 | Armanno, Sr. | |
| 5,722,208 A * | 3/1998 | Humphrey et al. | 52/220.8 |
| 5,797,234 A | 8/1998 | Theodorou | |
| 5,907,938 A * | 6/1999 | Sheahan | 52/410 |
| 5,918,438 A | 7/1999 | South | |
| 6,067,757 A | 5/2000 | Olson et al. | |
| 6,134,849 A * | 10/2000 | Holler | 52/80.1 |
| 6,240,694 B1 | 6/2001 | Castano | |
| 6,282,859 B1 * | 9/2001 | Van Der Heijden | 52/585.1 |
| 6,324,791 B1 | 12/2001 | Villar | |
| 6,557,316 B2 | 5/2003 | Van Der Heijden | |

(Continued)

Primary Examiner—David Dunn
Assistant Examiner—Benjamin Pevarski
(74) Attorney, Agent, or Firm—Paul S. Rooy

(57) ABSTRACT

A tornado resistant dome house. The shape of the dome house is a spheroid section, and is given by a formula. The dome house shell is made up of a plurality of tiles formed to conform to the shape of the dome house. The tiles are mutually connected by means of horizontally and vertically disposed elongate members extending through lumens in adjacent tiles. The tiles are also attached to a dome house foundation. The curved, low-profile shape of the house, combined with the mutual attachment of the tiles, and their attachment to the dome house foundation, improves the resistance of the dome house to high winds associated with tornadoes and hurricanes. Adjacent tiles are cushioned by springs, and are maintained in position relative to each other by means of a tongue-in-groove attachment between adjacent tiles.

17 Claims, 6 Drawing Sheets

U.S. PATENT DOCUMENTS

| | | |
|---|---|---|
| 6,880,298 B2 | 4/2005 | Davies |
| 6,976,344 B2 | 12/2005 | Sanger |
| 7,013,607 B1 | 3/2006 | South |
| 7,152,384 B1 | 12/2006 | McCarty |
| 7,458,186 B2 * | 12/2008 | Carter ........................ 52/81.1 |
| 2003/0046880 A1 | 3/2003 | Brown et al. |
| 2003/0126805 A1 | 7/2003 | Roberts |
| 2003/0167702 A1 * | 9/2003 | Davies ........................ 52/81.1 |
| 2004/0065026 A1 | 4/2004 | Wilson |
| 2007/0022672 A1 | 2/2007 | Bachynski |
| 2008/0066393 A1 * | 3/2008 | Sorensen ..................... 52/81.1 |

* cited by examiner

TORNADO RESISTANT DOME HOUSE

BACKGROUND OF THE INVENTION

1. Field of the Invention

This invention relates to structures, and in particular to a tornado resistant dome house.

2. Background of the Invention

Windstorms, including tornadoes and hurricanes, cause large amount of damage each year, both in the form of property structure damage and injury to persons. Winds associated with tornadoes in particular can rise to 300 miles per hour. Thus, it would be desirable to provide a dome house capable of resisting these magnitudes of storm.

There is a limit to the power of a tornado: the maximum pressure differential cannot exceed about 13 pounds per square inch ("psi"), because absolute pressure cannot descend below 0 psi at ground level, versus about 14.7 psi maximum ambient pressures nearby.

In order to survive this type of pressure differential and associated winds, a very streamlined shape is required, with little or no protrusions, overhangs, etc. Every portion of the outside must be a rounded self-supportive shape such that no matter which way the winds impinges upon it, the force is transmitted to an adjoining, adjacent area of wall downwind. Too large a building presents too much vertical surface for this purpose.

The structure must be very strong, in an engineering sense. Walls could be fabricated of precast and reinforced masonry (for high impact resistance), and formed to a pre-determined, constantly changing curvature (for minimal wind resistance).

Sections of wall must be secured together, one to another, both horizontally and vertically, to act as if they were one solid block, for wind resistance and turbulence resistance. This securing together can by accomplished by high strength steel cable or by heavy all-thread steel rods inside conduits cast in the wall and/or roof sections. In any event each row of sections would be cinched tightly against coiled steel spring tension, to permit expansion and contraction, with temperature and weather, without damage. This would also assist in erection (which may be accomplished using a fork lift), and makes it possible to replace any sections damaged by flying objects, if necessary.

The vertical cables or rods must be secured to the concrete foundation via anchors to avoid wind lift-off of the walls and roof. The low silhouette of the upper portion of the dome minimizes the wind resistance to high-velocity horizontal wind, and reduces the total weight that must be supported in this area. Because the roof is at a low confronting angle to any flying debris it is unlikely that the roof will become impacted and damaged by wind-borne objects, which are less likely to be massive at this reduced height.

Accordingly, it would be desirable to provide a tornado resistant dome house whose shape is low-profile and optimal for resisting strong winds associated with windstorms such as tornadoes and hurricanes, and whose construction features a plurality of tiles mutually connected by elongate members such as cables or metal rods, which hold the tiles together and prevent them from blowing apart in the presence of strong winds.

SUMMARY OF THE INVENTION

Accordingly, it is an object of the present invention to provide a tornado resistant dome house whose shape is conducive to resisting tornado and hurricane wind speeds. Design features allowing this object to be accomplished include a specific formula for the shape of the dome house, and construction incorporating shape-conforming tiles. Benefits associated with the accomplishment of this object include reduction of the possibility of structure damage during windstorms, and the attendant cost savings in repair.

It is another object of the present invention to provide a tornado resistant dome house whose tiles are mutually attached. Design features allowing this object to be accomplished include a plurality of tile vertical lumens, and tile horizontal lumens, with elongate members in the lumens. Advantages associated with the accomplishment of this object include a stronger structure, enhanced windstorm resistance, and the attendant cost savings in repair.

It is still another object of this invention to provide a tornado resistant dome house whose tiles are attached to the dome house foundation. Design features enabling the accomplishment of this object include tiles having tile vertical lumens, elongate members in the tile vertical lumens, and means of attaching a lower end of the elongate members to the dome house foundation. Advantages associated with the accomplishment of this object include a stronger structure, enhanced windstorm resistance, and the attendant cost savings in repair.

It is another object of the present invention to provide a tornado resistant dome house whose tiles are indexed relative to each other. Design features allowing this object to be accomplished include a tongue-in-groove connection between adjacent tiles. Benefits associated with the accomplishment of this object include a stronger structure, enhanced windstorm resistance, and the attendant cost savings in repair.

It is still another object of this invention to provide a tornado resistant dome house whose tiles are cushioned relative to each other. Design features enabling the accomplishment of this object include springs disposed between adjacent tiles. Advantages associated with the realization of this object include reduced stress and shock on tiles as the dome house expands and contracts with windstorm-induced pressure changes, and temperature and ambient pressure changes, the consequent reduced possibility of tile damage, and the associated reduction in ensuing repair cost.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIGS. 1 and 2. Sheet two contains FIGS. 3 and 4. Sheet three contains FIG. 5. Sheet four contains FIG. 6. Sheet five contains FIGS. 7 and 8. Sheet six contains FIGS. 9 and 10.

DETAILED DESCRIPTION OF THE PREFERRED EMBODIMENT

The instant tornado resistant dome house incorporates two important advances in structures designed to resists high winds. The first is the dome shape of the structure itself, which is illustrated in FIGS. 1-4. The smooth, precisely curved, low-profile shape illustrated in these figures significantly improves the ability of the dome house to resist wind damage.

The second advance incorporated into the instant tornado resistant dome house is the construction system used in the dome house, which ties a plurality of tiles together, not only to themselves, but also to the dome house foundation, and the dome house opening frames such as windows and doors. This construction system is depicted in FIGS. 5-10.

Figure 1:
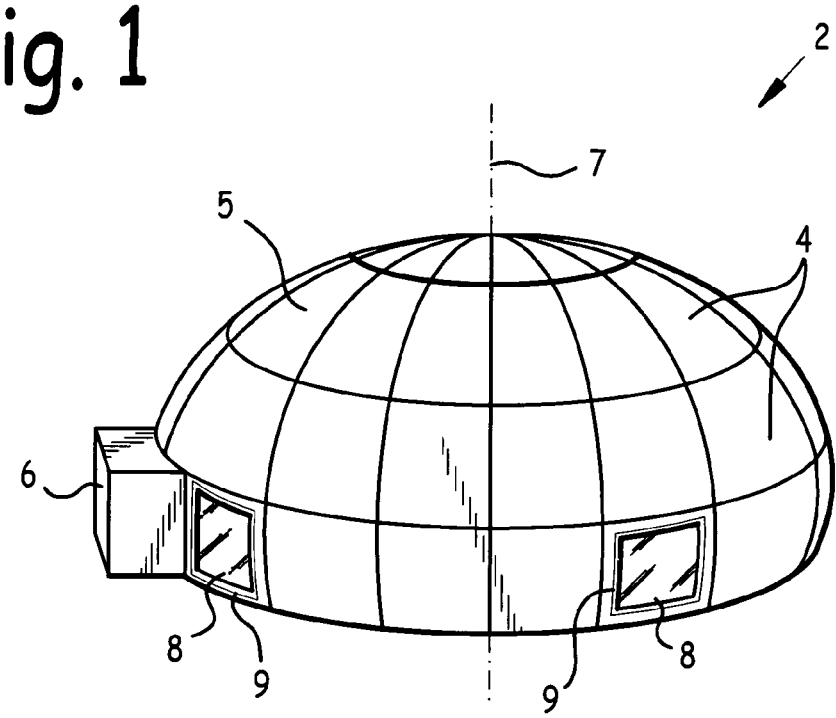
FIG. 1 is a side isometric view of a dome house.
Figure 2:
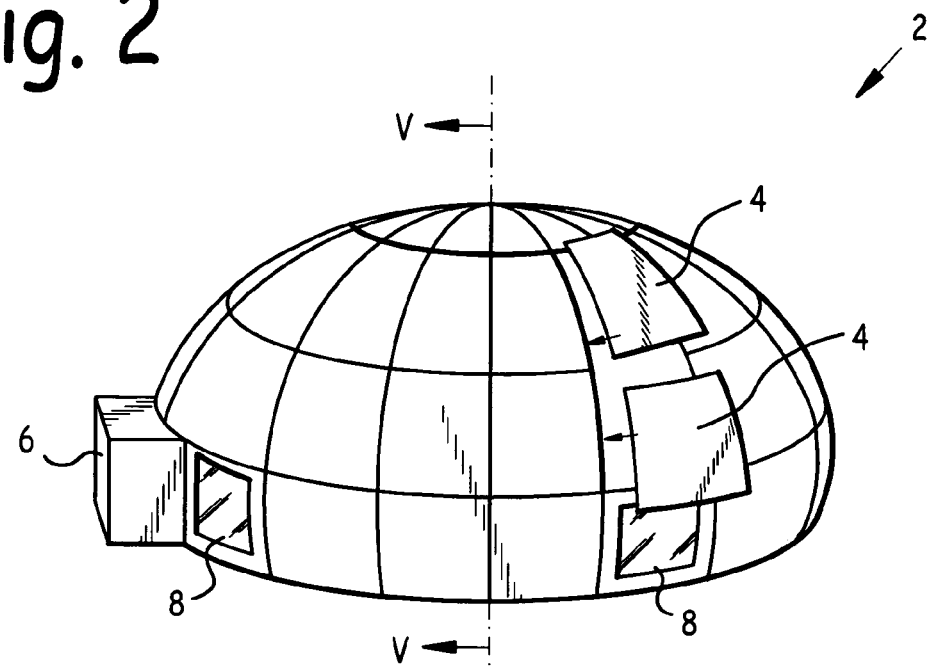
FIG. 2 is a side isometric view of a dome house with two tiles removed.

FIG. 1 is a side isometric view of dome house 2. FIG. 2 is a side isometric view of dome house 2 with two tiles 4 removed. As may be observed in these figures, dome house 2 comprises dome house shell 5 made up of a plurality of tiles 4. Tiles 4 are molded to smoothly conform to the overall shape of dome house shell 5, in order to provide the specific smooth, low-profile shape taught by the instant invention.

Dome house 2 may comprise windows 8 with respective window frames 9, and door(s) 6, which fulfill the usual functions of these elements.

Figure 3:
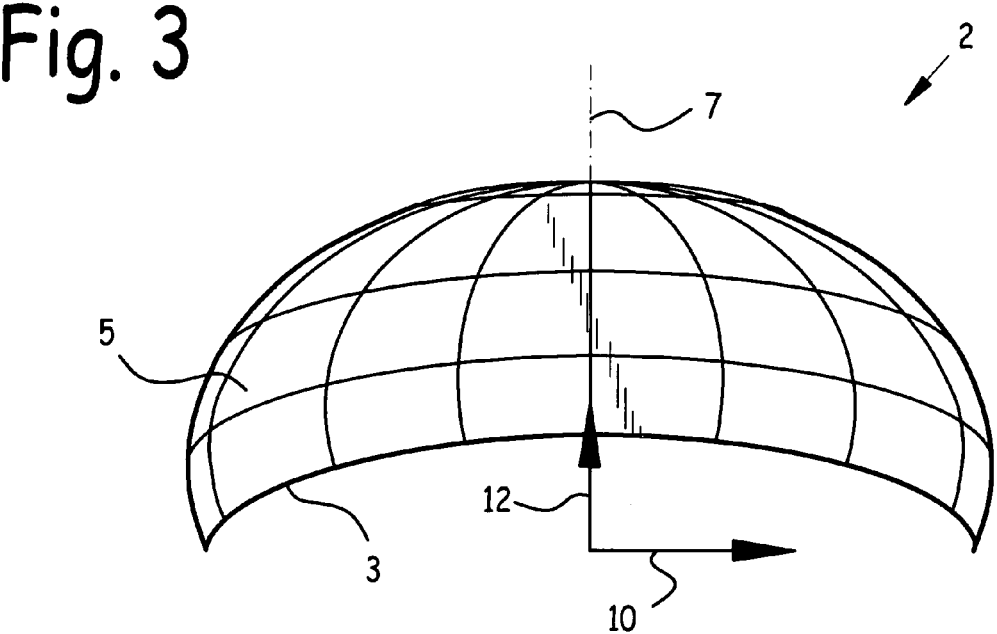
FIG. 3 is a side isometric cross-sectional view of a dome house with a two-dimensional Cartesian coordinate system at its center.
Figure 4:
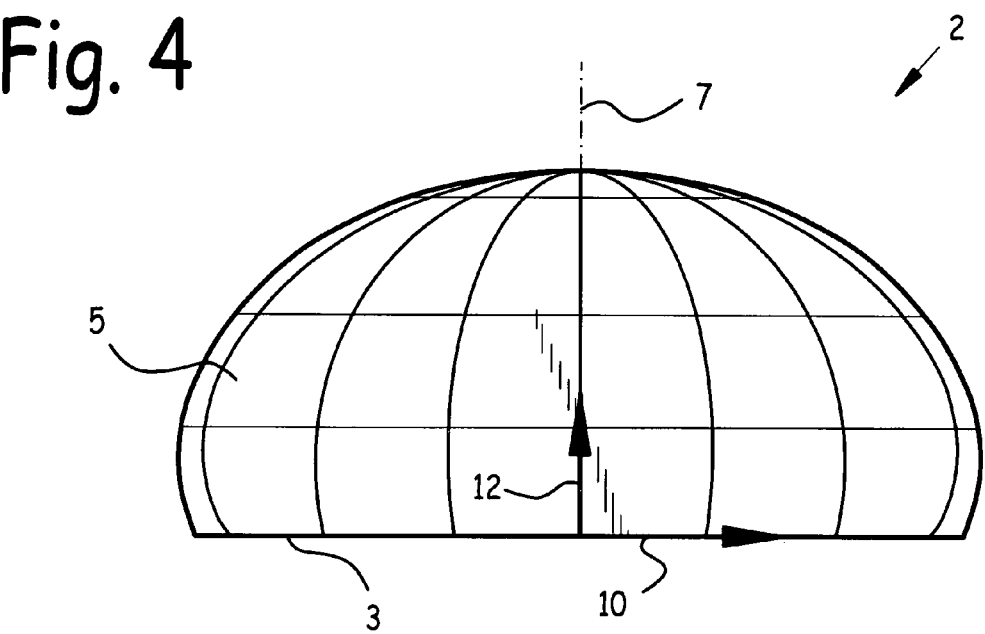
FIG. 4 is a side cross-sectional view of a dome house with a two-dimensional Cartesian coordinate system at its center.

FIG. 3 is a side isometric cross-sectional view of dome 2 house with a two-dimensional Cartesian coordinate system at its center; FIG. 4 is a side cross-sectional view of dome house 2 depicting the Cartesian coordinate system at its center.

The two-dimensional Cartesian coordinate system depicted in FIG. 3 at the center of dome house 2 comprises x-axis 10 and y-axis 12. The origin of this coordinate system is in a plane containing the lower edge 3 of dome house 2, and at the center of lower edge 3. Because the shape of dome house 2 is symmetrical about its vertical axis 7, the plan view shape of lower edge 3 is a circle.

The shape of the instant dome house is substantially described by the equation:

$$x^2/37.2^2+y^2/25.9^2=1$$

The above formula yields the shape of dome house 2 depicted in the drawings. It has been determined experimentally that this shape is optimal for increasing resistance of structures such as dome house 2 to the effects of windstorms such as tornadoes and hurricanes.

It is readily apparent that the above formula yields the upper section of a three-dimensional spheroid shape which is symmetrical about its vertical axis. Thus, the side cross-sectional shape of dome house 2, taken at a plane containing the vertical axis 7 of dome house 2, is described by the above formula, where x is the abscissa and y is the ordinate of a two-dimensional Cartesian coordinate system whose origin is located at the intersection of dome house 2 vertical axis 7 and a plane containing dome house lower edge 3. As may be observed in FIGS. 3 and 4, the y-axis of the Cartesian coordinate system co-extends with the dome house vertical axis 7, and the x-axis is contained in the plane containing dome house lower edge 3.

FIGS. 5-10 depict the construction system used in dome house 2, which ties a plurality of tiles 4 together, not only to themselves, but also to the dome house foundation 30 and dome house opening frames, such as window frames 9, and door 6 or doorway frames.

Figure 5:
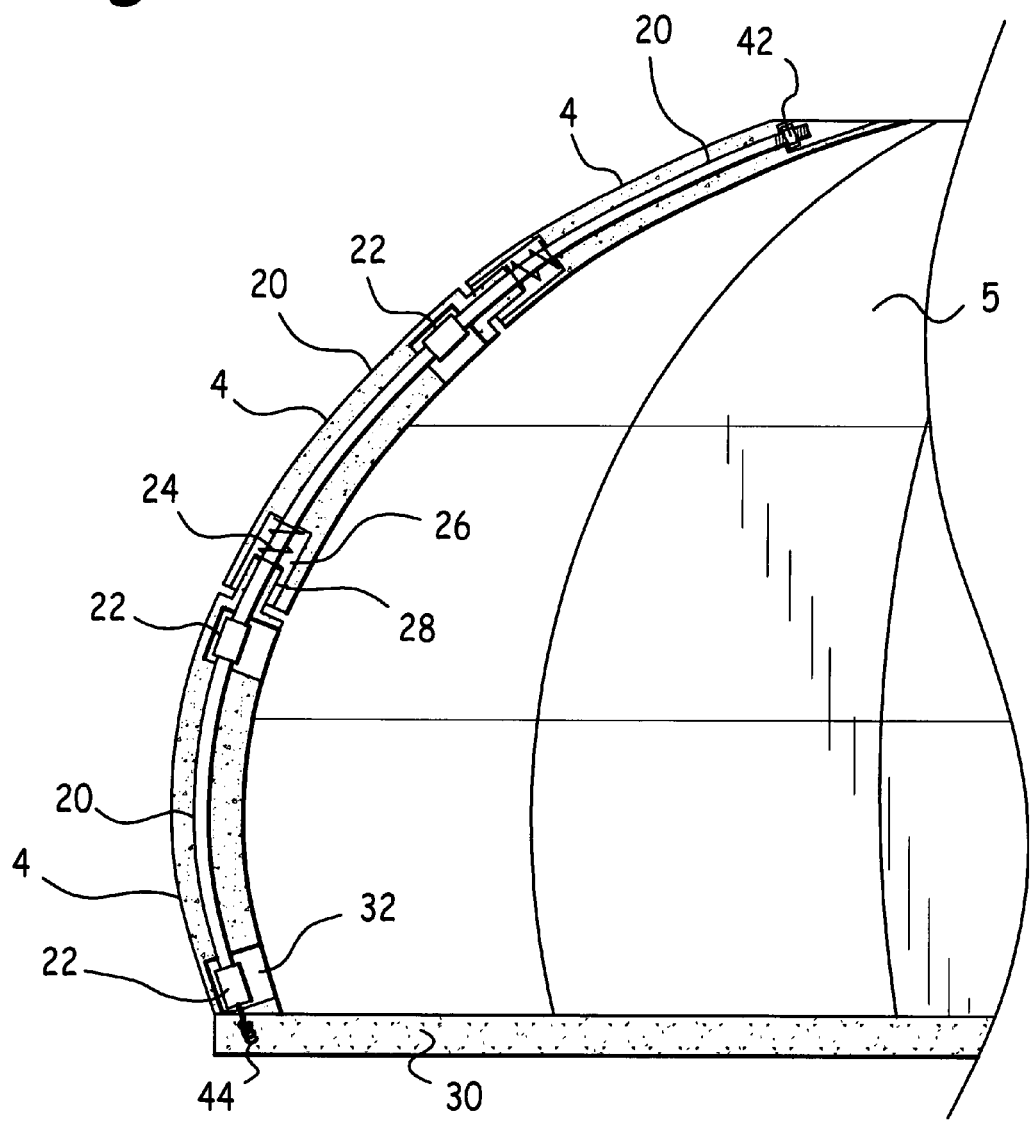
FIG. 5 is a side cross-sectional view of a dome house taken at section V-V of FIG. 2.
Figure 6:
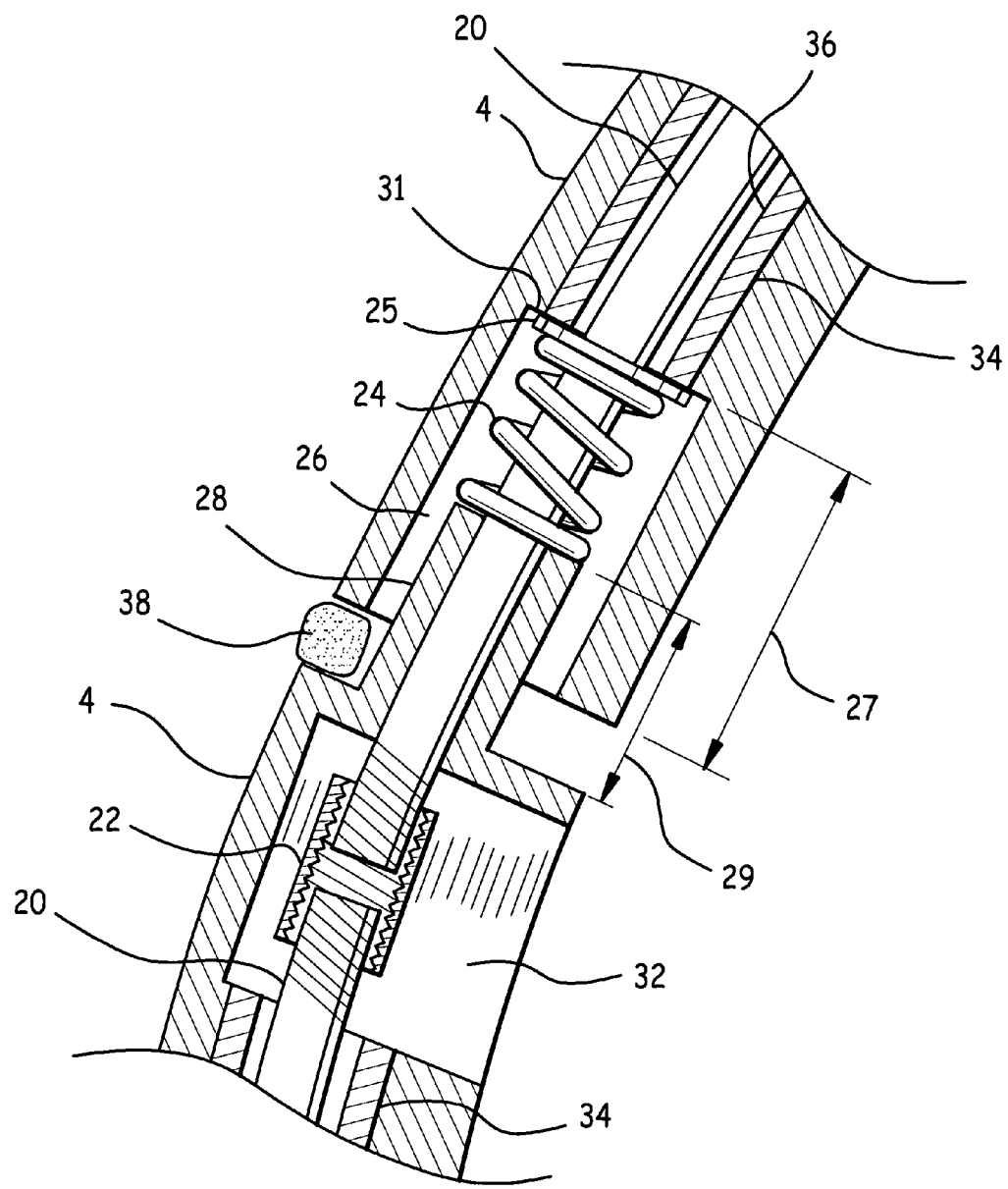
FIG. 6 is a detail side cross-sectional view of the vertical attachment between two tiles.

FIG. 5 is a side cross-sectional view of dome house 2 taken at section V-V of FIG. 2. FIG. 6 is a detail side cross-sectional view of the vertical attachment between two tiles 4. As may be observed in these figures, tiles 4 comprise at least one tile vertical lumen 34 sized to admit elongate member 20. Tile vertical lumen 34 may be lined with conduit 36 sized to admit elongate member 20.

Elongate members 20 may be attached end-to-end at couplings 22. In the preferred embodiment, each series of elongate members 20 connected end-to-end were attached at an upper end to an uppermost tile 4, and at a lower end to dome house foundation 30. In the figures, elongate members 20 are depicted as rods threaded at each end, and coupling 22 as a coupling having a bore threaded to accept threads of elongate members 20. In another embodiment, elongate members 20 may be cables, and connectors 22 may be cable clamps. It is intended to fall within the scope of this disclosure that elongate members 20 may be any appropriate elongate member, and couplings 22 may be any appropriate means of mutually connecting two or more elongate members 20.

Each coupling 22 is accessible via a respective coupling access port 32, which may communicate with an interior of dome house 2 as depicted in FIG. 6, or with an exterior of dome house 2.

Adjacent tiles 4 are mutually indexed by means of a tile groove 26 in one tile 4, and a tile tongue 28 in an adjacent tile 4. Tile groove 26 is sized to slidably admit tile tongue 28.

As may be observed in FIG. 6, the upper tile 4 tile vertical lumen 34 communicates with tile groove 26, and in the lower tile 4 tile vertical lumen 34 extends through tile tongue 28. A tile vertical lumen 34 in one tile 4 communicates, or aligns, with a corresponding tile vertical lumen 34 in an adjacent tile 4, so that elongate member 20 can extend through both tile vertical lumens 34. This mutual communication of tile vertical lumens 34 in adjacent tiles 4 allows a common elongate member 20, or a single series of elongate members 20, to run vertically through a the stack of tiles 4 depicted in FIG. 5, all the way from dome house foundation 30 to an upper tile 4. The common elongate member 20, or the series of elongate members 20, is attached to top tile 4 at one end and dome house foundation 30 at an opposite end, thus securely holding in place all tiles it transverses.

Spring 24 is sandwiched in compression between tile tongue 28 and tile groove floor 31. Spring 24 is sized to encircle elongate member 20, yet be too large to slide into conduit 36 or tile vertical lumen 34. In an alternate embodiment, washer 25 sized to admit elongate member 20 may be disposed between spring 24 and tile groove floor 31, an exterior diameter of washer 25 being too large to fit into tile vertical lumen 34.

Thus, tile groove depth 27 is sufficient to admit at least part of tile tongue depth 29, plus spring 24. In this fashion, adjacent tiles 4 are cushioned relative to each other by spring 24, and held in position relative to each other by elongate member(s) 20, with the tile tongue 28 of one tile 4 slidably disposed within the tile groove 26 of the adjacent tile 4. Sealant 38 may be disposed between the adjacent tile 4 edges to prevent the entry of water or humidity into tile groove 26, tile vertical lumen 34, and/or the interior of dome house 2.

Figure 7:
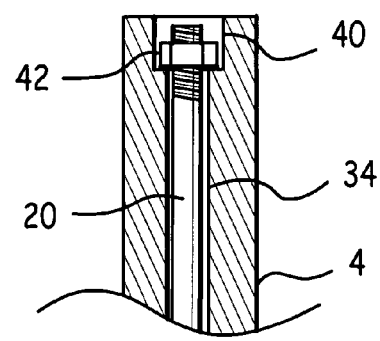
FIG. 7 is a detail side cross-sectional view of the attachment between the end of an elongate member and a tile.

FIG. 7 is a detail side cross-sectional view of the attachment between the end of an elongate member 20 and a tile 4, such as may occur to attach the top row of tiles 4 in dome house 2 to elongate members 20. As may be observed in this figure, tile vertical lumen 34 terminates in fastener recess 40, which may be a tile groove 26. An appropriate fastener 42 (sized to fit into fastener recess 40) is attached to the end of elongate member 20 which extends into fastener recess 40.

In FIG. 7, elongate member 20 is depicted as a rod threaded at its end, and fastener 42 as a bolt sized to mate with the threads of elongate members 20. In another alternative, elongate member 20 may be a cable, and fastener 42 may be a cable clamp. It is intended to fall within the scope of this disclosure that elongate member 20 may be any appropriate elongate member, and fastener 42 may be any appropriate means of holding the end of elongate member 20 in fastener recess 40.

Figure 8:
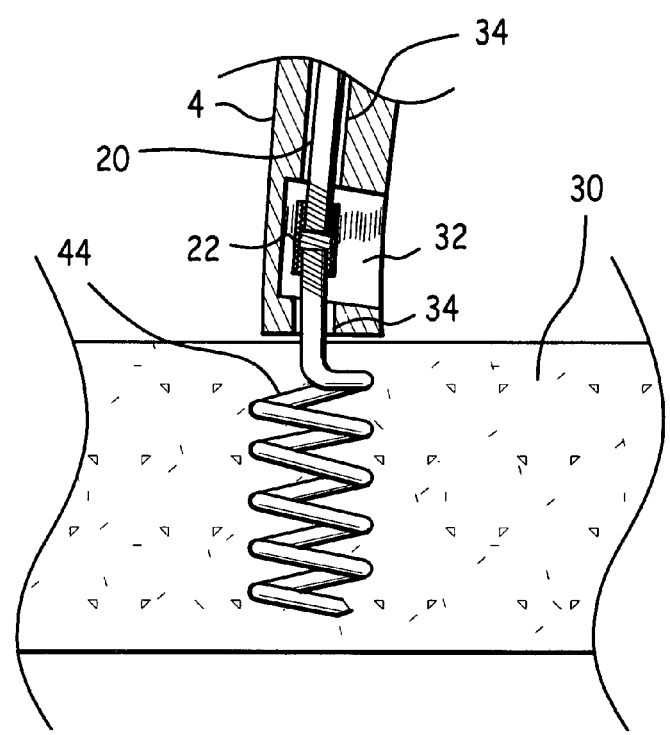
FIG. 8 is a detail side cross-sectional view of the attachment between the end of an elongate member and the dome house foundation.

FIG. 8 is a detail side cross-sectional view of the attachment between the end of an elongate member 20 and dome house foundation 30. A tile 4 resting on dome house foundation 30 comprises tile vertical lumen 34 communicating with coupling access port 32.

Anchor 44 is attached to foundation 30, and an upper end of anchor 44 extends into the tile vertical lumen 34 at the lower edge of the tile 4, which communicates with coupling access port 32. Coupling access port 32 in turn communicates with tile vertical lumen 34, which extends upwards from coupling access port 32.

Elongate member 20 extends downwards into coupling access port 32, and is attached to the upper end of anchor 44 by means of coupling 22. In FIG. 8, elongate member 20 is depicted as a rod threaded at its lower end, and coupling 22 as a coupling having a bore threaded to accept the thread of elongate member 20. In the alternative, elongate member 20 may be a cable, and connector 22 may be a cable clamp. It is intended to fall within the scope of this disclosure that elongate members 20 may be any appropriate elongate member, and coupling 22 may be any appropriate means of connecting elongate member 20 to anchor 44.

Figure 9:
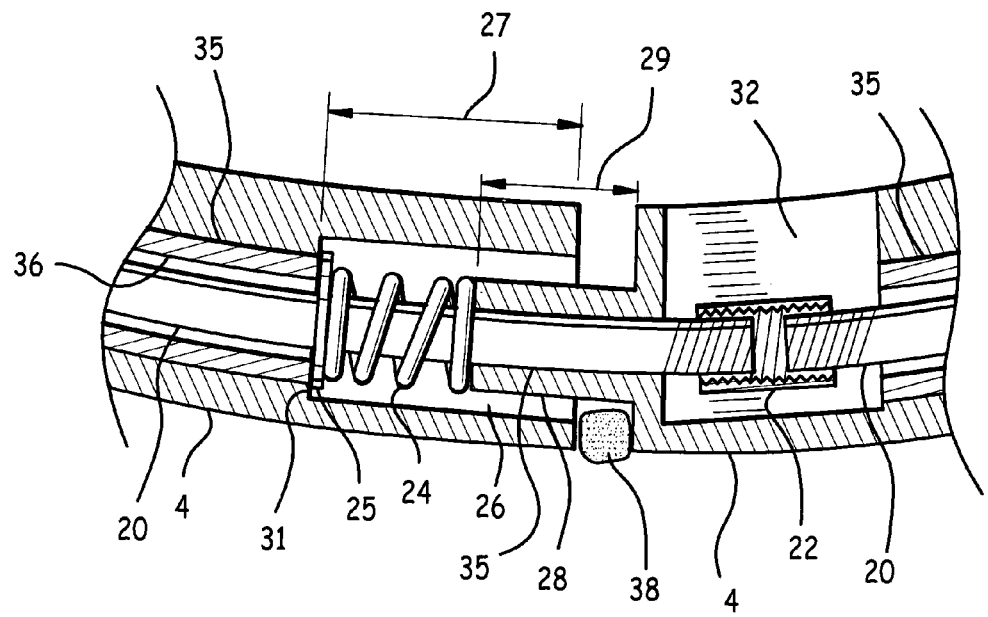
FIG. 9 is a detail top cross-sectional view of the horizontal attachment between two tiles.

FIG. 9 is a detail top cross-sectional view of the horizontal attachment between two tiles 4. Elongate members 20 are attached end-to-end at couplings 22. In the preferred embodiment, each series of elongate members 20 formed a closed round shape corresponding to the plan view shape of dome house 2, which in the preferred embodiment was substantially circular. Each individual ring of elongate members 20 was disposed within a ring of corresponding tile horizontal lumens 35, in turn also substantially circular in plan view shape.

Figure 10:
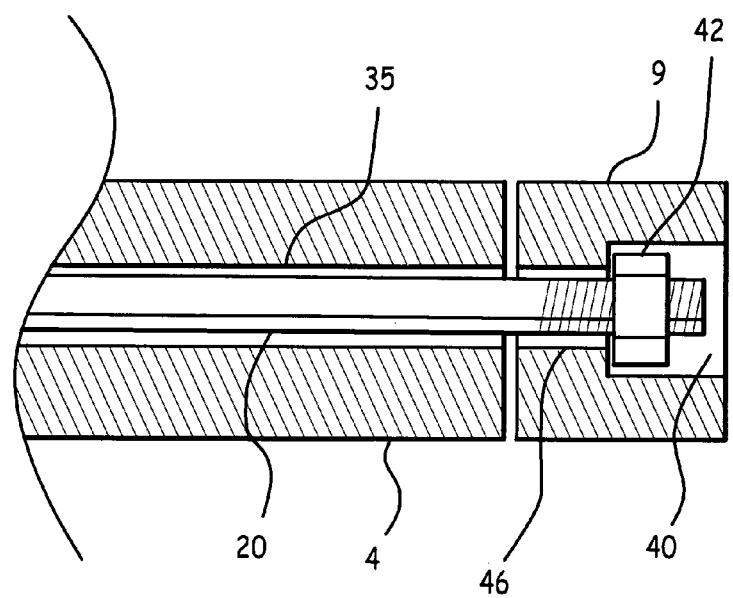
FIG. 10 is a detail top cross-sectional view of the attachment between the end of an elongate member and a dome house door or window frame.

Each tile horizontal lumen 35 in one tile 4 communicates, or aligns, with a corresponding tile horizontal lumen 35 in an adjacent tile 4, so that elongate member 20 can extend through both tile horizontal lumens 35. This mutual communication of tile horizontal lumens 35 in adjacent tiles 4 allows a common elongate member 20, or a single series of elongate members 20, to run horizontally all the way around a row of tiles 4, forming a closed ring when its ends are attached.

Where the run of an elongate member 20 ring is interrupted by an opening in dome house 2, such as a door 6 or doorway opening, or a window 4, the run of the elongate member 20 ring is interrupted for the width of the opening, and the free ends of the elongate member 20 ring are attached to the frame 9 surrounding the opening, as depicted in FIG. 10.

In the figures, elongate members 20 are depicted as rods threaded at each end, and coupling 22 as a coupling having a bore threaded to accept threads of elongate members 20. In an alternate embodiment, elongate members 20 may be cables, and connectors 22 may be cable clamps. It is intended to fall within the scope of this disclosure that elongate members 20 may be any appropriate elongate member, and couplings 22 may be any appropriate means of mutually connecting two or more elongate members 20.

Each couplings 22 is accessible via a respective coupling access port 32, which may communicate with an interior of dome house 2 as depicted in FIG. 9, or with an exterior of dome house 2.

Adjacent tiles 4 are mutually indexed by means of a tile groove 26 in one tile 4, and a tile tongue 28 in an adjacent tile 4. Tile groove 26 is sized to slidably admit tile tongue 28.

As may be observed in FIG. 9, in the left tile 4 tile horizontal lumen 35 communicates with tile groove 26, and in the right tile 4 tile horizontal lumen 35 extends through tile tongue 28. Spring 24 is sandwiched in compression between tile tongue 28 and tile groove floor 31. Spring 24 is sized to encircle elongate member 20, yet be too large to slide into conduit 36 or tile horizontal lumen 35. In an alternate embodiment, washer 25 sized to admit elongate member 20 may be disposed between spring 24 and tile groove floor 31, an exterior diameter of washer 25 being too large to fit into tile horizontal lumen 35.

Thus, tile groove depth 27 is sufficient to admit at least part of tile tongue depth 29, plus spring 24. In this fashion, adjacent tiles 4 are cushioned relative to each other by spring 24, and held in position relative to each other by elongate member(s) 20, with the tile tongue 28 of one tile 4 slidably disposed within the tile groove 26 of the adjacent tile 4. Sealant 38 may be disposed between adjacent tile 4 edges to prevent the entry of water or humidity into tile groove 26, tile vertical lumen 34, and/or the interior of dome house 2.

FIG. 10 is a detail top cross-sectional view of the attachment between the end of an elongate member 20 and the frame 9 surrounding an opening in dome house 2 such as a door, doorway or window. As may be observed in this figure, frame 9 incorporates frame lumen 46 sized to admit elongate member 20, which terminates in fastener recess 40 sized to admit fastener 42. Fastener 42 is too large to fit into tile horizontal lumen 35. An appropriate fastener 42 is attached to the end of elongate member 20 which extends through tile horizontal lumen 35 and frame lumen 46 into fastener recess 40.

In FIG. 10, elongate member 20 is depicted as a rod threaded at its end, and fastener 42 as a bolt sized to mate with the threads of elongate members 20. In another alternative, elongate member 20 may be a cable, and fastener 42 may be a cable clamp. It is intended to fall within the scope of this disclosure that elongate member 20 may be any appropriate elongate member, and fastener 42 may be any appropriate means of holding an end of elongate member 20 in fastener recess 40.

In the preferred embodiment tiles 4 and dome house foundation 30 were concrete, synthetic, or any other appropriate material. Elongate member 20 was a threaded rod, cable, or any other appropriate elongate member. Coupling 22 was a coupling having a threaded bore, a cable clamp, or any other appropriate coupling. Fastener 42 was a bolt, cable clamp, or any other appropriate means to secure an end of elongate member 20 in fastener recess 41 using fastener 42.

While a preferred embodiment of the invention has been illustrated herein, it is to be understood that changes and variations may be made by those skilled in the art without departing from the spirit of the appending claims.

DRAWING ITEM INDEX 2 dome house
3 dome house lower edge
4 tile
5 dome house shell
6 door 7 vertical axis
8 window
9 window frame
10 x-axis
12 y-axis
20 elongate member
22 coupling
24 spring
25 washer
26 tile groove
27 tile groove depth
28 tile tongue
29 tile tongue depth
30 dome house foundation
31 tile groove floor
32 coupling access port
34 tile vertical lumen
35 tile horizontal lumen
36 conduit
38 sealant
40 fastener recess
42 fastener
44 anchor
46 frame lumen

I claim:

1. A tornado resistant dome house, whose shape is a section of a spheroid, comprising a plurality of tiles, at least one tile horizontal bore in each said tile, each said tile horizontal bore communicating with another said tile horizontal bore in an adjacent tile, an elongate member extending through each said tile horizontal bore, a tile tongue extending from one said adjacent tile, a tile groove sized to slidably admit said tile tongue in another said adjacent tile, a tile groove floor in said tile groove, and a spring disposed between said tile groove floor and said tile tongue, said spring being sized to slidably fit around said elongate member and to slidably fit within said groove, whereby said spring cushions adjacent said tiles between which it is disposed, and protects said adjacent tiles from shock damage.

2. The tornado resistant dome house of claim 1 further comprising means of attaching an end of said elongate member to a frame of an opening in said dome house.

3. A tornado resistant dome house, whose shape is a section of a spheroid, comprising Cartesian coordinate system being contained in said second plane, said tornado resistant a plurality of tiles, at least one tile vertical bore in each said tile, each said tile vertical bore communicating with another said tile vertical bore in an adjacent tile, an elongate member extending through each said tile vertical bore, a tile tongue extending from one said adjacent tile, a tile groove sized to slidably admit said tile tongue in another said adjacent tile, a tile groove floor in said tile groove, and a spring disposed between said tile groove floor and said tile tongue, said spring being sized to slidably fit around said elongate member and to slidably fit within said groove, whereby said spring cushions adjacent said tiles between which it is disposed, and protects said adjacent tiles from shock damage.

4. The tornado resistant dome house of claim 3 further comprising a dome house foundation, and means of attaching one end of said elongate member to said foundation.

5. The tornado resistant dome house of claim 4 further comprising means of attaching an end of said elongate member to an upper tile.

6. A tornado resistant dome house, whose shape is a section of a spheroid, comprising a plurality of tiles; means of indexing adjacent said tiles relative to each other; and means of mutually attaching adjacent said tiles;

said means of indexing adjacent said tiles comprising a tile tongue extending from one said adjacent tile, and a tile groove sized to slidably admit said tile tongue in another said adjacent tile; and said and means of mutually attaching adjacent said tiles comprising at least one tile bore in each said tile, each said tile bore communicating with another said tile bore in an adjacent said tile, and at least one elongate member extending through each series of communicating said tile bores, a tile groove floor in said tile groove, and a spring disposed between said tile groove floor and said tile tongue, said spring being sized to slidably fit around said elongate member and to slidably fit within said groove, said spring being sized too large to fit into said tile bore, whereby said spring cushions adjacent said tiles between which it is disposed, and protects said adjacent tiles from shock damage.

7. The tornado resistant dome house of claim 6 wherein successive said elongate members are attached end-to-end by a coupling, and a coupling access port is disposed in said tile corresponding to each said coupling.

8. The tornado resistant dome house of claim 7 wherein each said elongate member is a threaded rod, and each said coupling comprises a threaded bore sized to mate with said threaded rod.

9. The tornado resistant dome house of claim 7 wherein each said elongate member is a cable, and each said coupling is a cable clamp.

10. The tornado resistant dome house of claim 3 further comprising a washer between said spring and said tile groove floor, said washer being sized to slidably admit said elongate member, a diameter of said washer being too large to fit into said bore, whereby said washer prevents said spring from sliding into said bore.

11. The tornado resistant dome house of claim 6 further comprising conduit disposed within said tile bores, said conduit being sized to slidably admit said elongate member.

12. The tornado resistant dome house of claim 6 further comprising sealant between adjacent said tiles, whereby entry of moisture into said tornado resistant dome house may be prevented.

13. The tornado resistant dome house of claim 6 further comprising an anchor embedded in said dome house foundation and a coupling attaching said anchor to said elongate member.

14. The tornado resistant dome house of claim 13 wherein said elongate member is a threaded rod, and said coupling comprises a threaded bore sized to mate with said threaded rod and a thread on said anchor.

15. The tornado resistant dome house of claim 13 wherein said elongate member is a cable, and said coupling is a cable clamp.

16. The tornado resistant dome house of claim 6 further comprising a fastener recess in said tile communicating with one said tile vertical bore, and a fastener attached to an end of said elongate member extending into said fastener recess.

17. The tornado resistant dome house of claim 6 further comprising a fastener recess in said frame communicating with one said tile horizontal bore through a frame bore, and a fastener attached to an end of said elongate member extending into said fastener recess.

* * * * *

UNITED STATES PATENT AND TRADEMARK OFFICE
CERTIFICATE OF CORRECTION

PATENT NO. : 7,765,746 B2  
APPLICATION NO. : 11/880642  
DATED : August 3, 2010  
INVENTOR(S) : Robert S. Reed It is certified that error appears in the above-identified patent and that said Letters Patent is hereby corrected as shown below:

Column 7 Lines 44 et seq. reads: ...a spheroid, comprising Cartesian coordinate system being contained in said second plane, said tornado resistant a plurality of tiles, at least one tile vertical bore...

Column 7 Line 44 et seq. should read: ...a spheroid, comprising a plurality of tiles, at least one tile vertical bore...

Signed and Sealed this

Twelfth Day of October, 2010

David J. Kappos  
*Director of the United States Patent and Trademark Office*